(12) United States Patent
Daniel

(10) Patent No.: US 8,180,926 B2
(45) Date of Patent: May 15, 2012

(54) ADAPTABLE RESOURCE SPOOFING FOR AN EXTENDED COMPUTER SYSTEM

(75) Inventor: David A. Daniel, Scottsdale, AZ (US)

(73) Assignee: Nuon, Inc., Scottsdale, AZ (US)

( * ) Notice: Subject to any disclaimer, the term of this patent is extended or adjusted under 35 U.S.C. 154(b) by 184 days.

(21) Appl. No.: 12/587,787

(22) Filed: Oct. 13, 2009

(65) Prior Publication Data

US 2010/0106883 A1   Apr. 29, 2010

Related U.S. Application Data

(60) Provisional application No. 61/195,851, filed on Oct. 10, 2008.

(51) Int. Cl.
*G06F 3/00* (2006.01)
*G06F 13/00* (2006.01)
*G06F 9/00* (2006.01)

(52) U.S. Cl. ............ 710/3; 710/5; 710/36; 710/62; 711/100; 713/1

(58) Field of Classification Search ............ None
See application file for complete search history.

(56) References Cited

U.S. PATENT DOCUMENTS

2008/0037420 A1* 2/2008 Tang ............... 370/229
2008/0196099 A1* 8/2008 Shastri ............ 726/12

* cited by examiner

*Primary Examiner* — Alan Chen
(74) *Attorney, Agent, or Firm* — Robert C. Klinger

(57) ABSTRACT

A spoofing module that mimics remote computer resources to optimize system responsiveness and avoid expiration of intentional and unintentional timeouts in extended computer systems. The invention is capable of appearing to the host system and selectively responding to the host system as if it were the actual hardware. The invention includes a throttling mechanism to prevent data over-run.

18 Claims, 6 Drawing Sheets

FIG. 5

| RBA (IP Address) | Bridge (by bus #s) | Device | Latency (Ave Roundtrip) | Completion Timeout Mask |
|---|---|---|---|---|
| 00-0A-E6-4D-52-C7 | Pri = Bus 8<br>Sec = Bus 9 | Device 0 | 80 mS | SET required |
| 00-4A-F2-54-86-D6 | Pri = Bus 16<br>Sec = Bus 18 | Device 0 | 40 uS | SET not required |
| . . . | . . . | . . . | . . . | . . . |
| 00-1A-92-DF-BF-F3 | Pri = Bus 12<br>Sec = Bus 13 | Device 0 | 15 uS | SET not required |

ADAPTABLE RESOURCE SPOOFING FOR AN EXTENDED COMPUTER SYSTEM

CLAIM OF PRIORITY

This application claims priority of U.S. Provisional Patent Application Ser. No. 61/195,851 entitled "ADAPTABLE RESOURCE SPOOFING FOR AN EXTENDED COMPUTER SYSTEM" filed Oct. 10, 2008, the teachings of which are incorporated herein by reference.

FIELD OF THE INVENTION

The present invention relates to extension of a computer's native system bus via high speed data networking protocols.

BACKGROUND OF THE INVENTION

There is growing acceptance of techniques that leverage networked connectivity for extending and centralizing the resources of host computer systems. In particular, networked connectivity is being widely utilized for specialized applications such as attaching storage to computers. iSCSI makes use of TCP/IP as a transport for the SCSI parallel bus to enable low cost remote centralization of storage. The problem with iSCSI is it has a relatively narrow (storage) focus and capability.

Another trend is the move towards definition and virtualization of multiple computing machines within one host system. Virtualization is particularly well suited for blade server installations where the architecture is optimized for high density compute resources and pooled storage. The virtualization of CPU cycles, memory resources, storage, and network bandwidth allows for unprecedented mobility, flexibility, and adaptability of computing tasks.

PCI Express, as the successor to PCI bus, has moved to the forefront as the predominant local host bus for computer system motherboard architectures. A cabled version of PCI Express allows for high performance directly attached bus expansion via docks or expansion chassis. These docks and expansion chassis may be populated with any of the myriad of widely available PCI Express or PCI/PCI-X bus adapter cards. The adapter cards may be storage oriented (i.e. Fibre Channel, SCSI), video processing, audio processing, or any number of application specific Input/Output (I/O) functions. A limitation of PCI Express is that it is limited to direct attach expansion. A problem with certain blade server architectures is PCI Express is not easily accessible, thus expansion is awkward, difficult, or costly.

Gbps Ethernet is beginning to give way to 10 Gbps Ethernet. This significant increase in bandwidth enables unprecedented high performance applications via networks.

A hardware/software system and method that collectively enables virtualization of the host bus computer's native I/O system architecture via the Internet, LANs, WANs, and WPANs is described in commonly assigned U.S. patent application Ser. No. 12/148,712, the teaching of which is included in its entirety in the present application. The system described therein, designated "i-PCI", achieves technical advantages as a hardware/software system and method that collectively enables virtualization of the host computer's native I/O system architecture via the Internet, LANs, WANs, and WPANs. The system includes a solution to the problems of the relatively narrow focus of iSCSI, the direct connect limitation of PCI Express, and the inaccessibility of PCI Express for expansion in blade architectures.

This system allows devices native to the host computer native I/O system architecture—including bridges, I/O controllers, and a large variety of general purpose and specialty I/O cards—to be located remotely from the host computer, yet appear to the host system and host system software as native system memory or I/O address mapped resources. The end result is a host computer system with unprecedented reach and flexibility through utilization of LANs, WANs, WPANs and the Internet, as shown at 10 in FIG. 1.

A problem with extended computer systems is the introduced additional latency not seen in un-extended systems. This introduced latency can create conditions that result in various timeouts. Any extended system solution that includes significant latency such as that seen particularly with the Internet, WANs and WPANs—and ignores this issue—cannot work.

SUMMARY OF THE INVENTION

The present invention achieves technical advantages as a solution to the consequences of introduced latency, namely the various timeouts that can occur as a result, in extended computer systems. The cumulative effects of timeouts can render an extended computer system impractical due to retries, resets, resends, and error messages, The invention is a spoofing mechanism that mimics remote computer resources to a host system as necessary to optimize system responsiveness and avoid expiration of intentional and unintentional timeouts in extended computer systems. The invention is capable of appearing to the host system and selectively responding to the host system as if it were the actual extended computer system hardware. The invention also includes a throttling mechanism to prevent data over-run. The net result is a functional and practical extended computer system.

BRIEF DESCRIPTION OF THE DRAWINGS

FIG. 5 is a table of latency measurements initialized by the System Data Transfer Optimization Utility.

DETAILED DESCRIPTION OF THE PRESENT INVENTION

Figure 1:
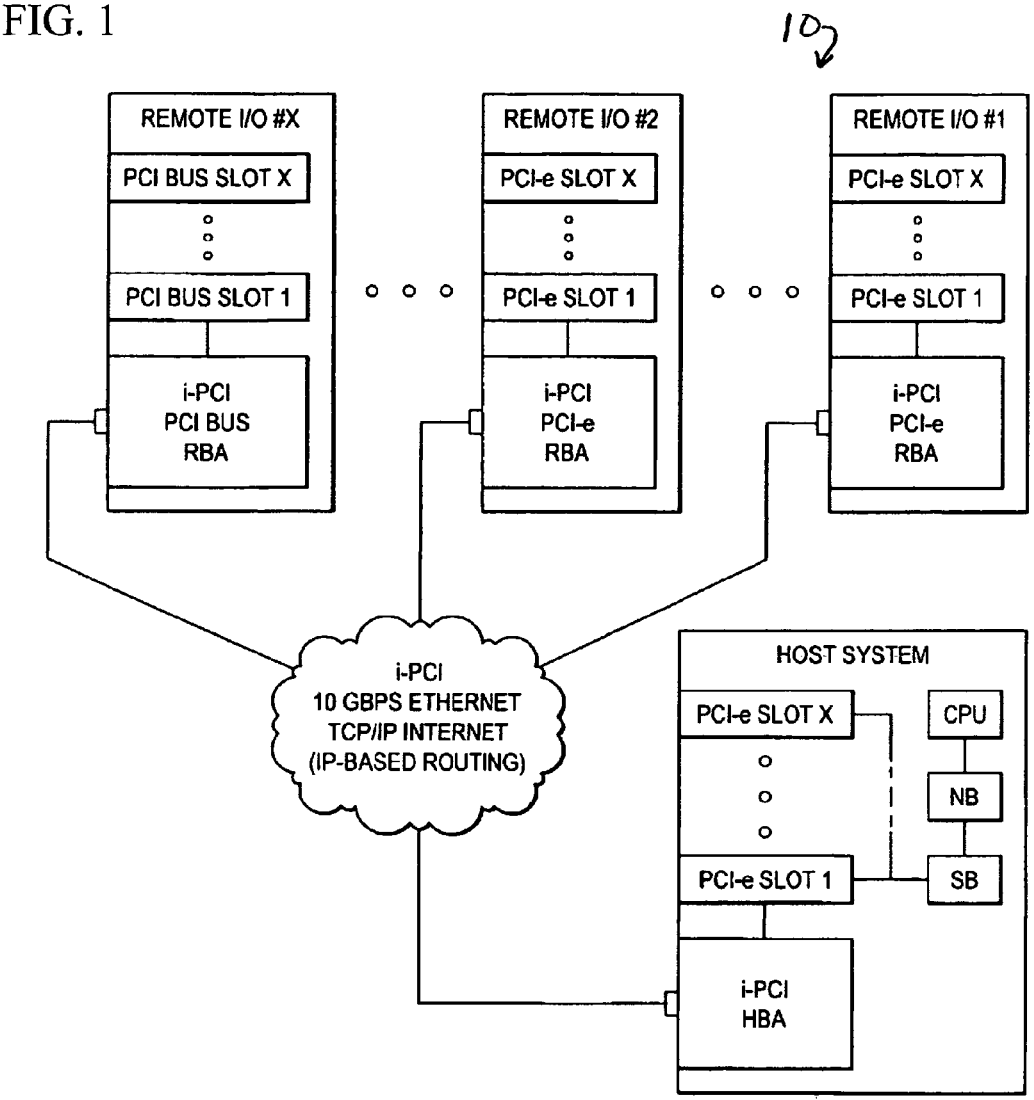
FIG. 1 depicts using the Internet as a means for extending a computer system's native bus via high speed networking.

A computer system can experience several different sources of timeouts. For example in PCI Express based systems, the assorted timeout mechanisms include but are not limited to the following:

PCI System Timeouts:

The PCI Express Specification includes a timeout mechanism for split transaction completion. Any PCI Express device that issues requests requiring completions must implement the completion timeout mechanism. The requirements for this timer are:

Must not expire in less than 50 μs.
Should not expire in less than 10 ms.
Must expire if transaction is not completed within 50 ms.

If the timer expires, it results in the generation of an Uncorrectable, Non Fatal error.

The PCI Express Specification includes an ACK/NAK protocol replay timer. The PCI Express Replay Timer in the original sending bridge will typically expire as a result of the extra time it will take to receive back an ACK via the Internet or LANs.

Intentional Driver Timeouts: I/O device drivers may be written to include intentional timeouts. Typically, these timeouts do not occur during initialization, but are seen from within an executing application that uses the driver. The main types of driver timeouts seen are:

Device query response time. If a device does not respond to a query within an expected time, the driver may report an error or go into a reset state.

Data transfer time. If a device does not return the amount of data required within the expected time, a driver may experience data starvation. The driver may report an error, request a resend, or go into a reset state.

Unintentional Driver Timeouts: I/O device drivers may be written in a way that unintentional timeouts are included in the code. Device driver developers often don't validate and verify their code other than with the intended device inserted in an upper tree bus, (i.e. bus 1). There may be a lack of driver robustness in handling extended latencies, even though longer latencies may not adversely impact the use of the device. The results of the unintentional timeouts can be unpredictable. If the driver is particularly poorly written, an unexpected termination, system destabilization, or a system crash results.

Intentional Application Timeouts: Applications may be written to include intentional timeouts. The main types of application timeouts seen are:

Driver response time. If a device driver is unable to deliver the results of a device transaction within an expected time, the application may erroneously assume the device is not present or it may indicate the device is not working properly or that the device driver is corrupted or malfunctioning.

Data transfer time. If a device driver does not deliver the amount of data required within the expected time, the application may experience data starvation. The application may struggle, lurch, and perform at a reduced functionality, it may stop execution and indicate the device is not working properly, it may indicate the device has been unintentionally removed, or indicate the device driver is corrupted or malfunctioning.

Unintentional Application Timeouts: Applications may be written in a way that unintentional timeouts are included in the code. Applications developers often don't validate and verify their code other than with the intended device inserted in an upper tree bus, (i.e. bus 1). There may be a lack of application robustness in handling extended latencies, even though longer latencies may not adversely impact the use of the device. The results of the unintentional timeouts can be unpredictable. If an application is particularly poorly written, an application may freeze or terminate and exit without explanation.

Advantageously, the present invention is a solution to handle at least these problems. The primary components according to one preferred embodiment of the present invention are a Controller and Protocol Converter 101, a Resource Cache Reflector/Mapper 102, an RSYNC logic 202 and a PCI Express (PCI-e) DLLP Handler 203.

Figure 2:
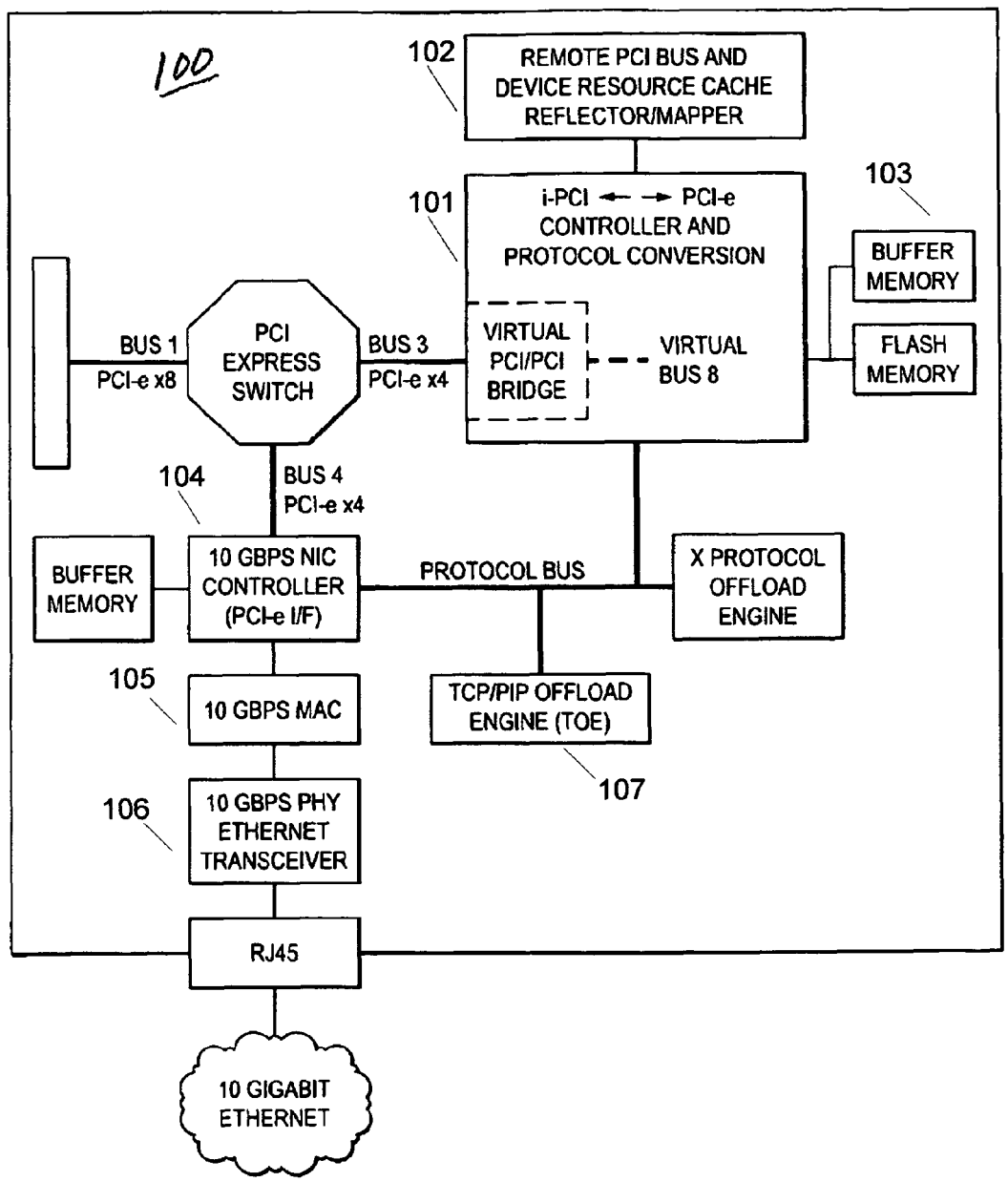
FIG. 2 depicts the Host Bus Adapter (HBA) block diagram, showing the major functional blocks.

In one preferred embodiment, the invention is implemented in a PCI Express Host Bus Adapter (HBA) shown at 100 in FIG. 2. One HBA design includes the Controller and Protocol Converter 101, memory 102 for implementing a mirror and cache to reflect the remote I/O resources, as well as buffers 103, a 10 Gbps NIC Controller 104, MAC 105, PHY 106, and TCP/IP Offload Engine (TOE) 107.

Figure 3:
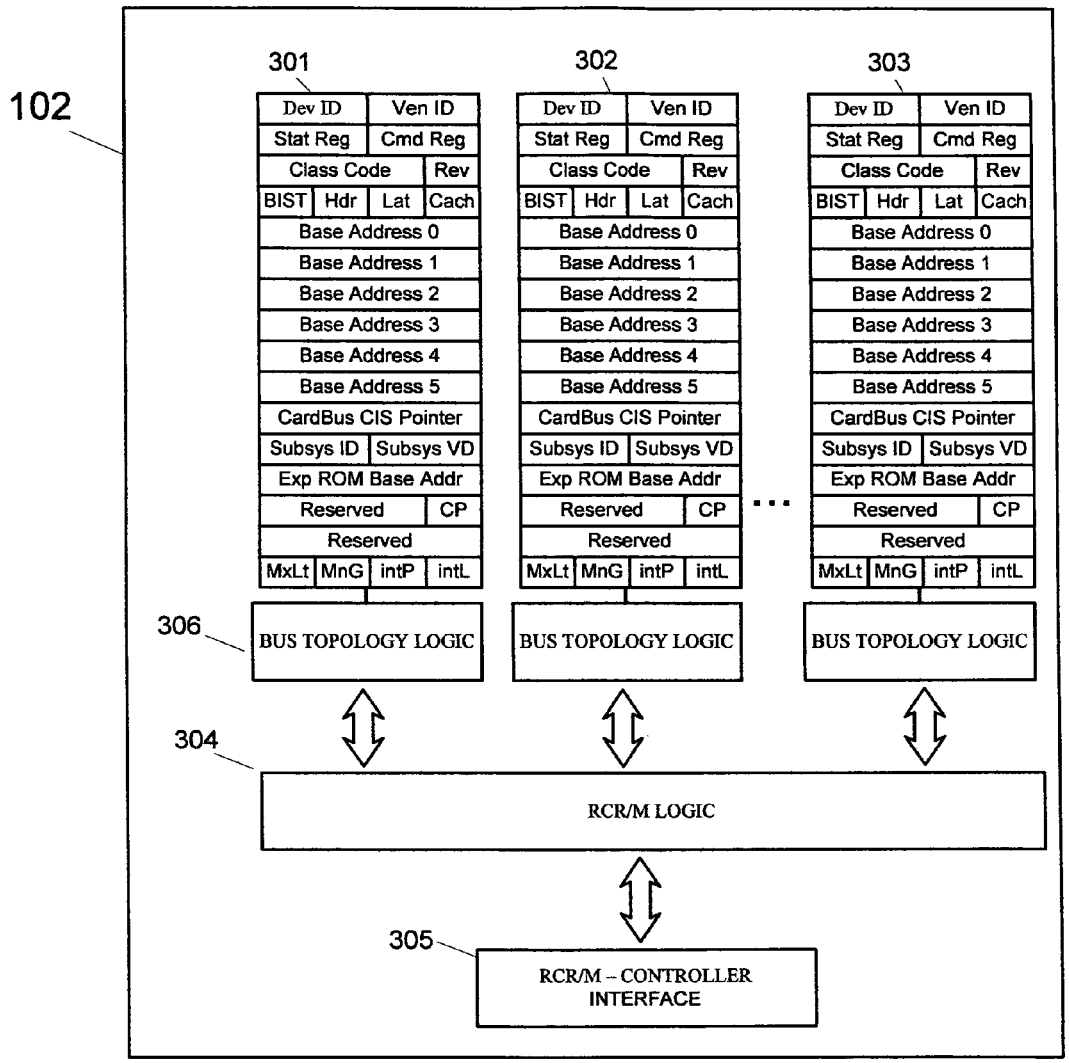
FIG. 3 depicts the Resource Cache Reflector/Mapper (RCR/M)

The HBA mirror and cache 102 is a complete PCI System mirror referred to as the Resource Cache Reflector/Mapper (RCR/M). Referring to FIG. 3, the RCR/M 102 is resident in logic and nonvolatile read/write memory on the HBA 100. The RCR/M 102 consists of an interface 305 to the Controller and Protocol Converter and logic configured for accessing configuration data structures. The data structures 301, 302, 303 contain entries representing remote PCI bridges and PCI device configuration registers and bus segment topologies 306. These data structures are pre-programmed via a user interactive System Data Transfer Optimization Utility 201. Following a reboot, during enumeration the BIOS "discovers" these entries, interprets these logically as the configuration space associated with actual local devices, and thus assigns the proper resources to the mirror.

Figure 4:
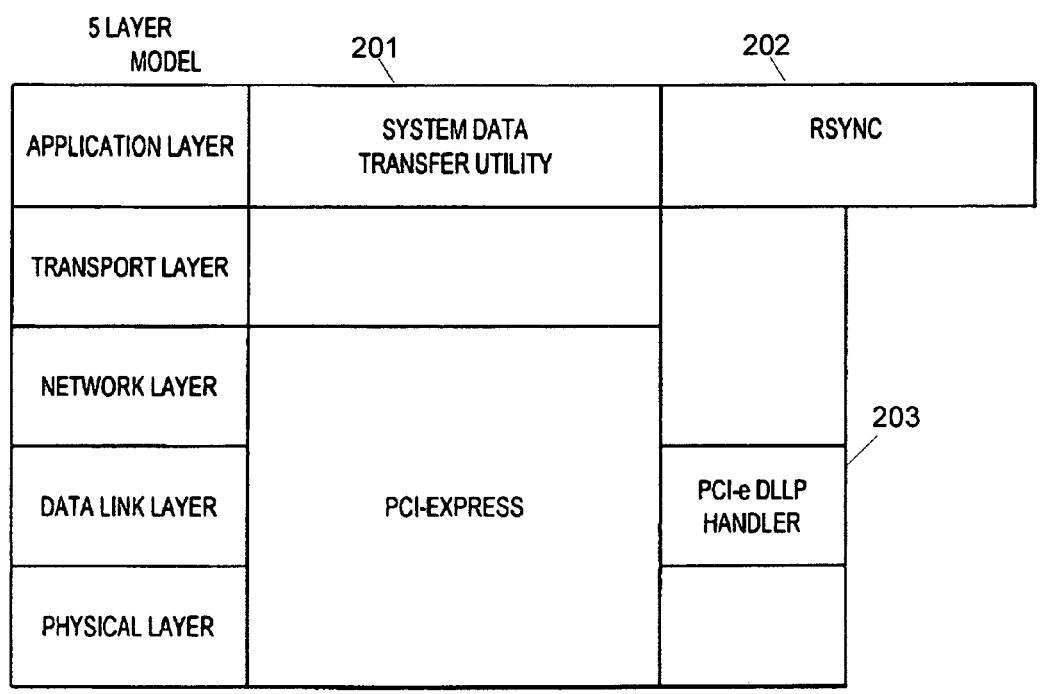
FIG. 4 depicts the software/firmware/logic model for the invention.

Referring to FIG. 4, the System Data Transfer Optimization Utility 201 is a user interactive utility that allows setup of the mirror 102 during a prior boot-up and the storing of the resulting mirror configuration in nonvolatile memory on the HBA 100.

The software/firmware/logic consists of the System Data Transfer Utility, RSYNC and the PCI Express (PCI-e) DLLP Handler.

The HBA 100 includes logic (or alternatively firmware) referred to as RSYNC 202. RSYNC 202 is contained within the Controller and Protocol Converter 101. Following the mirror configuration response, RSYNC 202 synchronizes the RCR/M 102 with the associated Remote Bus Adapter (RBA) device configuration register (not shown) via a data transaction.

Following configuration and upon normal operation, RSYNC 202 then also detects and snoops PCI Express hot swap packet traffic passing through the HBA 100. RSYNC 202 updates the PCI System mirror 102 (Resource Cache Reflector/Mapper or "RCR/M") for all changes (if there were any net changes) that occur as a result dynamic add/removal of resources in the extended system.

The associated response behavior for different types of transactions—are enabled or disabled by the System Data Transfer Optimization Utility 201 with the following results:

Configuration Registers Mirror Enabled:

RSYNC 202 responds to configuration address space transactions for remote I/O devices and bridges.

The HBA 100 configuration registers mirror 102 is constantly updated and kept in sync via regular data exchanges between the Controller and Protocol Converter 101 and the RBAs.

Following a configuration response, RSYNC re-syncs with the affected RBA device configuration register.

Data Transfer Response Enabled:

The Controller and Protocol Converter 101 is enabled to respond with a replay (duplicate data) cached in the case of a read or accept data on behalf of the RBA in the case of a write.

PCI System Timeout Handler Enabled:

The HBA 100 includes a table of latency measurements in non-volatile memory, updated regularly via packet exchanges with the RBAs.

Referring to FIG. 5, the table of latency measurements is initialized by the System Data Transfer Optimization Utility 201 during system initialization.

Table of latency measurements are indexed by RBA, bridge, and by device so that latency variations can be accounted for.

Advantageously, Thus the error is disabled.

Figure 6:
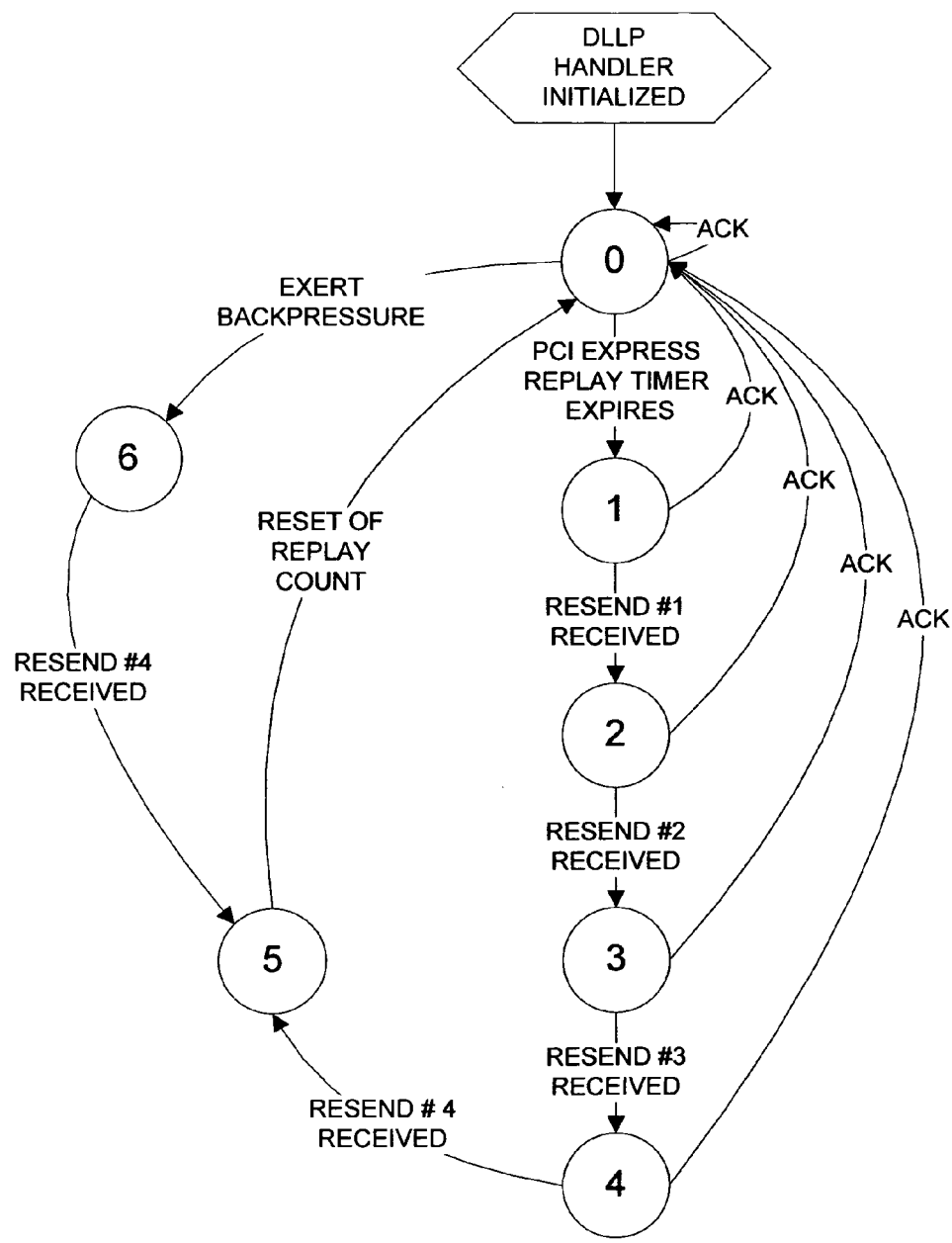
FIG. 6 is a flow chart showing the PCI Express DLLP Handler state machine.

The HBA 100 includes a unique and clever state machine referred to as The PCI Express DLLP Handler 204, as shown in FIG. 6. The DLLP Handler 204 is in State 0, monitoring the PCI Express Replay Timer. Upon expiration of the PCI Express Replay Timer, the sending bridge blocks acceptance of new Transaction Layer Packets (TLPs) from the transaction layer and resends the outstanding TLPs in its replay buffer. The expiration of the timer causes the PCI Express DLLP Handler 204 to transition to State 1. The DLPP Handler 204 "understands" that the resend is the result of the extra time needed to return an ACK across the network. Upon receiving each additional resend, the DLPP Handler 204 intercepts the resends transitioning through States 2, 3 and 4 with each resend and does not pass them on to the NIC or TOE. Advantageously, this keeps the sending bridge from flooding the network with resends. If an ACK is received, it transitions back to State 0. The PCI Express protocol allows up to 4 expirations of the timer before going into a link retraining state. In event that the replay timer expires the maximum of 4 times and goes into a link retrain state, the PCI Express DLLP Handler 204 enters State 5. In State 5 it spoofs the PCI Express link retrain sequence, causing a reset of the replay count. The "Replay Timeout" and Replay Number Rollover" errors that result are both classified as a "Correctable Error" by PCI Express. The reporting of these errors is optional and for i-PCI they may be disabled by clearing the "Correctable Error Reporting Enable" bit in the Device Control Register. Thus, the extra time necessary to return an ACK/NAK is managed locally within this state machine and is transparent to the host.

Advantageously, the DLLP Handler 204 may be utilized to intentionally throttle data from the source. In State 4, when the Replay Timer expires, acceptance of new TLPs is automatically blocked. This mechanism can be used intentionally to prevent overwhelming of the Internet or LANs by the data source (i.e. application). The Controller and Protocol Converter 101 may command the DLLP Handler 204 to transition to State 6. In State 6 the DLLP Handler 204 holds a received ACK to cause the replay timer to expire to exert back pressure and slow down TLP generation.

The RCR/M 102 may also be totally disabled, so that all PCI transactions are simply passed through to the RBA. This may be satisfactory for implementations where the particular extended system implementation introduces little additional latency.

Though the invention has been described with respect to a specific preferred embodiment, many variations and modifications will become apparent to those skilled in the art upon reading the present application. The intention is therefore that the appended claims be interpreted as broadly as possible in view of the prior art to include all such variations and modifications.

What is claimed is:

1. A programmable spoofing module operable with a host computer system and configured to mimic a remote I/O memory-mapped computer resource, wherein the programmable spoofing module is an extension of a native architecture of the host computer system.

2. The spoofing module as specified in claim 1 wherein the spoofing module is located proximate the host computer system, is configured to be enumerated by an I/O configuration mechanism of the host computer system and assigned I/O memory resources on behalf of the remote I/O memory-mapped computer resource, and is configured to appear to the host computer system, and selectively respond to the host computer system, as if the spoofing module was the remote I/O memory-mapped computer resource.

3. The spoofing module as specified in claim 2 wherein the spoofing module is configured to generate mimic signals responsive I/O signals of the host computer system, wherein the spoofing module configured to facilitate virtualization of the I/O memory-mapped computer resource.

4. The spoofing module as specified in claim 2 configured to improve responsiveness of the host computer system when operating with the remote I/O memory-mapped computer resource, and avoid expiration of intentional and unintentional timeouts in the host computer system.

5. The spoofing module as specified in claim 3 further comprising a throttling module configured to prevent data over-run.

6. The spoofing module as specified in claim 1 wherein the spoofing module is configured and resident in a Host Bus Adapter (HBA).

7. The spoofing module as specified in claim 6 wherein the HBA is a PCI Express Host Bus Adapter.

8. The spoofing module as specified in claim 1 further comprising a resource module including data structures configured to contain entries representing remote PCI bridges and PCI device configuration registers and bus segment topologies.

9. The spoofing module as specified in claim 8 configured such that following a reboot of the host computer system, during enumeration a BIOS is configured to discover the entries, interpret the entries logically as the configuration space associated with actual local devices, and assign proper resources to the resource module.

10. The spoofing module as specified in claim 8 wherein the resource module further comprising a controller and protocol converter.

11. The spoofing module as specified in claim 8 wherein the resource module is configured to implement a mirror and cache to reflect the host computer system remote I/O resources as a mirror configuration response.

12. The spoofing module as specified in claim 11 wherein the resource module is configured such that following the mirror configuration response, the resource module is configured to synchronize with an associated remote bus adapter device configuration register via a data transaction.

13. The spoofing module as specified in claim 12 wherein the resource module is configured to recognize and update as a function of any changes that occur as a result of dynamic add/removal of resources associated with the host computer system.

14. The spoofing module as specified in claim 1 further comprising a table of latency data associated with remote bus adapter devices operable with the host computer system.

15. The spoofing module as specified in claim 13 further comprising memory comprising the table and configured to be updated regularly via packet exchanges with the remote bus adapter devices.

16. The spoofing module as specified in claim 1 configured to prevent an error from being reported to the host computer system if a timeout of a remote bus adapter device occurs.

17. The spoofing module as specified in claim 14 wherein the resource module is configured to utilize the latency data such that if a PCI system completion timer is likely to expire in a device, bridge or root complex when posting transactions to one of the remote bus adapter devices, a completion timeout mask in a root port is set to prevent reporting this error to the host computer system.

18. The spoofing module as specified in claim 16 further comprising a resource module configured to prevent the error and configured as a state machine.

* * * * *